United States Patent [19]

Gabor

[11] 3,869,904
[45] Mar. 11, 1975

[54] ULTRASONIC CAMERAS

[75] Inventor: Dennis Gabor, London, England

[73] Assignee: Columbia Broadcasting System, Inc., New York, N.Y.

[22] Filed: May 10, 1966

[21] Appl. No.: 548,939

[30] Foreign Application Priority Data
May 12, 1965 Great Britain.................. 20025/65
July 7, 1965 Great Britain.................. 28771/65

[52] U.S. Cl................ 73/67.5 H, 340/5 H, 350/3.5
[51] Int. Cl. ......................................... G01n 29/04
[58] Field of Search .................... 73/67.5–67.9, 73/67.5 H, 432 L, 71.3; 350/3.5; 340/5 H, 5 I; 178/69 P; 356/4, 5

[56] References Cited
UNITED STATES PATENTS

| | | | |
|---|---|---|---|
| 2,164,125 | 6/1939 | Sokoloff............................. | 340/5 I |
| 2,733,597 | 2/1956 | Hardy................................. | 73/71.4 |
| 2,832,214 | 4/1958 | Trommler.......................... | 73/67.6 |
| 3,213,675 | 10/1965 | Goldman........................... | 73/67.5 |

FOREIGN PATENTS OR APPLICATIONS
876,475   5/1953   Germany................. 340/5 I

OTHER PUBLICATIONS

Y. N. Denisyuk, Photographic Reconstruction of the Optical Properties of an Object in its Own Scattered Radiation Field, Soviet Physics, Dec. 1962, pp. 543–545.
E. N. Leith, et al., Wavefront Reconstruction with Continuous-Tone Objects, J.O.S.A., Dec., 1963, pp. 1377–1381.
G. W. Stroke, Lensless Photography, International Science and Technology, May, 1965, pp. 52–60 & 85.
P. Gregus, Ultrasound Holograms Research Film, Vol. 5, No. 4, Dec., 1965, pp. 330–337.
Solomon, Leslie, "Doppler Laser," Electronics, p. 26, 7/20/62.
Smyth, C. N. et al., "The Ultra-Sound Image Camera," IEE Proceedings, Vol. 110, No. 1, pp. 16–28, Jan., 1963.

Primary Examiner—Richard C. Queisser
Assistant Examiner—John P. Beauchamp
Attorney, Agent, or Firm—Brumbaugh, Graves, Donohue & Raymond

[57] ABSTRACT

An ultrasonic camera wherein, the specularly reflective surface of a member vibrating at ultrasonic frequencies is illuminated by a beam of coherent light. The reflected frequency modulated light beam is then converted into a recordable amplitude modulated light beam by superimposing on the reflected beam an angularly displaced reference light beam having at least a fraction of the waves therein in phase quadrature with the waves of the reflected light beam.

18 Claims, 15 Drawing Figures

ULTRASONIC CAMERAS

This invention relates to ultrasonic cameras, that is to say devices by means of which ultrasonic vibrations in solid or fluid media are made visible.

An ultrasonic camera was first proposed by S. Y. Sokoloff in the early 1930's, and later workers have essentially followed his method. This consists in using an electron camera with a piezoelectric target, submerged in a fluid. The piezoelectric crystal plates which are attached to the vacuum envelope of the camera translate the ultrasonic vibrations into electric potentials, and these act on a scanning electron beam, whose response is ultimately displayed on a cathode ray screen.

This method met with some success, in particular for the detection of flaws in metal specimens, but it fell short of the principal aim of ultrasonic cameras, which is to provide an alternative to X-rays, in particular in the diagnosis of pregnancies, free from the dangers attending X-rays. The cameras has to be made small, as the thin envelope had to withstand the full air-vacuum pressure. Even with a thin envelope the screen could not be matched to water, but reflected most of the ultrasound energy. Moreover this reflection generated a set of standing waves, which produced a disturbing fringe system in photographs produced with such cameras.

The present invention provides novel apparatus for making ultrasound visible, with a minimum interference of the type which produces standing waves, and with no practical limitation on size. According to the present invention ultrasonic camera apparatus comprises an ultrasonic generator coupled to a fluid medium for containing an object to be viewed, the medium including an elastic screen matched to the medium and having a radiation reflecting surface, a source of coherent electromagnetic radiation, means for directing the radiation onto said surface and means utilising the Doppler effect for converting the radiation reflected from the surface into a viewable image.

One element of the invention is a screen which reflects light waves, but which is almost perfectly matched to the wave impedance of water, so that it follows its motion, and hardly if at all reflects the ultrasound waves. A first example of such a screen is a thin membrane of a material such as nylon or mylar or the like, which is thinly metallized on one surface, so that it has a coating which is specularly reflecting or diffusing. A second example is a thin, metallized spherical shell of a plastic material well matched to water, with a thickness equal to a small integer multiple of the half-wavelength of sound, so that the waves reflected at its front and rear surface cancel one another. Screens according to the invention present almost no obstacle to the ultrasound waves, but their vibrations are much too small to be seen by means as known in the optical art. The velocity amplitude of the water particles, and hence of the screen is only 0.38 cm/sec. at an ultrasound power of one milliwatt per square centimetre, independently of the frequency, and their displacement amplitude is only $2.10^{-8}$ cm or two Angstroms at a frequency of 3 megacycles per sec.

These minute vibrations are made visible in the invention by a novel application of laser radiation. The vibrating screen is illuminated with laser light, and the reflected light is observed by means to be described. The light reflected from the vibrating screen is frequency modulated by the Doppler effect, but his modulation is so minute as to be completely invisible by ordinary means. If the maximum velocity of the vibrating reflector is $v$, the frequency swing is a fraction $\pm 2v/c$ of the light frequency, where $c$ is the velocity of light. In the above example, with one milliwatt per cm$^2$ ultrasound power on the screen this is only a fraction $2.5 \times 10^{-11}$ of the laser light frequency. This minute frequency modulation is made visibile by the invention as follows. A fraction of the laser light is split off, and superposed on the beam returning from the vibrating screen. This light, whose frequency is unmodified, may be called the reference beam. Its intensity is made preferably equal to that of the reflected or image-carrying beam. By suitable choice of the optical paths traversed by the two beams, these are so phased relative to one another, that at least a fraction of the image-carrying rays are in quadrature with the reference rays with which they are brought into superposition, that is to say advanced or retarded by a quarter wave, at a photoelectric sensor, which is the output organ of the device. As will be explained later, this converts frequency modulation into amplitude modulation of the intensity resulting from the interference of the image-carrying beam and of the reference beam.

It is practically impossible to maintain an exact quadrature relation between two beams in an interference instrument one of whose organs is formed by a flexible membrane or shell, as a displacement of this organ by a quarter wave of light completely destroys the amplitude modulation. This difficulty is overcome according to the invention as follows. The phase difference between the image-carrying rays and the reference rays is not kept constant, but is made to vary in an approximately uniform manner across the screen, for instance from left to right. This is achieved in various ways in the several forms in which the invention is realised. In one variety of the invention the screen is uniformly illuminated with laser light, and an image of the screen is formed by an optical system. In this case the light returning after reflection at the screen forms a succession of wavefronts. On these is superposed a system of wavefronts of the reference beam, of similar shape and the same transverse extension, but such that the second system of wavefronts forms a suitable engle with the first system. As a result the two wavefronts form a system of interference fringes, for instance vertical. Their spacing is made preferably equal to or somewhat smaller than the resolution limit in the ultrasound image. The relative phase angle of the reflected beam and of the reference beam goes through a full circle between any two interference fringes. As will be proved later on, the result of the superposition is that in each zone between two fringes there are two lines along which there is pure frequency modulation, which is invisible, but between each two of the said lines there is a zone in which the frequency modulation has been translated into amplitude modulation, and in which the intensity varies periodically with the ultrasound frequency. This intensity modulation is still small, in the above example with 1 milliwatt per cm$^2$ sound power it is 4/1,000 in the centre of the zone and 2.5/1,000 in the average, but it is made visible by using a photoelectric device whose output is fed to an a.c. amplifier tuned to the ultrasound frequency. One or several such tuned photoelectric devices scan through the whole picture, and their amplified and rectified output is displayed on a cathode ray tube or the like. As there are two active, modulated zones per resolution limit no definition is lost. The scanning aperture of the photoelectric device must be one half of the resolution limit or a little less, to achieve this, because the modulations in adjacent active zones are in counterphase.

In other realizations of the invention no complete image of the screen is formed at any one time, but the screen is scanned sequentially by at least one laser beam, and this is brought to interference with a reference beam. In this case, wavefronts do not exist, or only partially, but the previous rule applies, that is to say the phase difference between the image-carrying rays and the reference rays with which they are brought to interference in the photoelectric output organ is made to vary in an approximately uniform manner during the scan, by means to be described.

So far there has been described measures which produce a light image of the vibrating screen. This is sufficient for taking shadow pictures of objects, similar to radiographs, and if an ultrasonic lens is used which focuses the object on the screen, images of the object itself can also be taken. But by a further modification of the invention images of the object or of cross sections of it can be taken also without any ultrasound lenses or mirrors. This modification consists in adding to the image carrying ultrasonic beam a coherent ultrasound reference beam, with the two impinging simultaneously on the screen. By this simple device it then becomes possible to focus any plane of a three dimensional object in the light-optical representation.

This striking phenomenon can be briefly explained by reference to what is known as "wavefront reconstruction," "holography," or "photography without lenses." (D. Gabor, Proc.Roy.Soc.A, 197, 457–84, 1949; Proc.Phys.Soc.B 64, 449–69, 1951; E. N. Leith and J. Upatnieks, J.Opt.Soc.Amer. 53, 1377–81, 1963.) The mathematical priciples are similar, though the physical processes are very different in the two cases. In holography an object is illuminated with coherent light, and the light reflected or refracted by the object is caught on a photo-graphic plate, which is at the same time illuminated with a coherent reference beam, preferably plane and at an angle to the plate. The resulting photograph or hologram contains in a coded form all the information on the object, which can be two dimensional or three dimensional. The ultrasound image obtained on the screen by the superposition of the image-carrying beam and the reference beam is a sound hologram. One can now take a photograph of the screen image, and treat it in the same way as in holography, that is to say develop it and illuminate it with a coherent reference beam. The object then appears before or behind the photographic plate, completely decoded, that is to say restored. But it has now been discovered that this is not necessary. If the scanned image plane is not the optical image of the screen, the image which is obtained by scanning such a plane is still an optical representation of a corresponding surface in the ultrasound space.

The reason is that the detection as described, by the superposition of a coherent optical reference beam and amplification of the a.c. component by a tuned amplifier is phase sensitive detection. It will give maxima whenever the image carrying wave is in quadrature to the reference wave, and minima, that is to say zeros, whenever it is in phase or antiphase with it. The effect is the same as in holography, with the difference that in holography maxima correspond to in-phase relation, and minima to antiphase, while in the present case maxima appear at the in-quadrature positions. This, however, is the same as if in holography the wavelengths both of the image-carrying beam and of the reference beam had been shortened to one-half, so that the number of the interference fringes is doubled. This does not affect at all the position of the surfaces at which the two beams are in a constant phase relation to one another, hence these surfaces are present everywhere in the optical space, just as in holography, and in the same position. Consequently the optical space contains the complete image of the sound space, and can be explored in depth. It may be noted though that such a three-dimensional representation of the sound field in the light field can be obtained only in those realisations of the invention in which the whole screen or at least a substantial part of it is simultaneously illuminated and imaged by a lens system. If the screen is scanned with a focused light beam only an image of the screen itself can be directly obtained.

The invention will be better understood with reference to the accompanying drawings in which.

Figure 3:
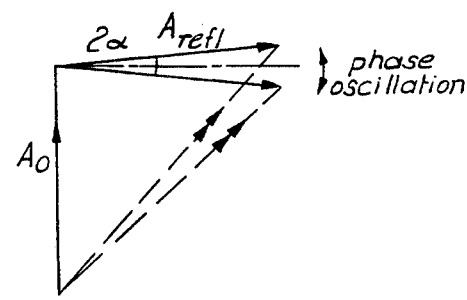

FIG. 3 explains the principle of converting frequency modulation into intensity modulation.

Figures 4A, 4B:
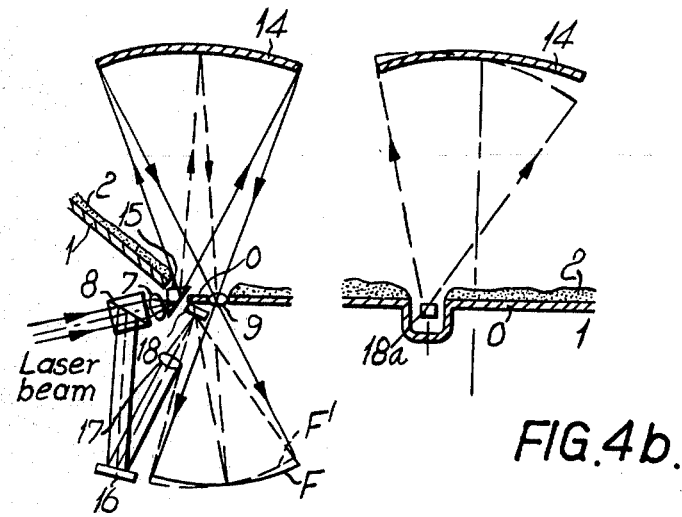

FIGS. 4a and 4b are views of an improved optical arrangement in which the vibrating screen is a spherical shell, with means for superposing an ultrasonic reference beam on the vibrating screen.

Figure 5A:
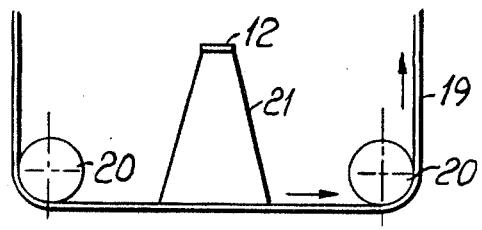
Figure 5B:
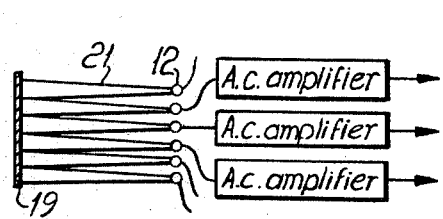
Figure 5C:
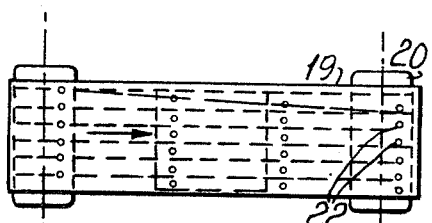

FIGS. 5a to 5c are three views of a scanning device for recording and displaying the ultrasonic images.

FIGS. 6a to 6c and 7a and 7b are representations of devices in which the laser light is concentrated in a narrow strip on the screen, which is swept at right angles to itself by an optical scanning device, while the output is sensed by several photoelectric organs in parallel.

Figures 8A, 8B:
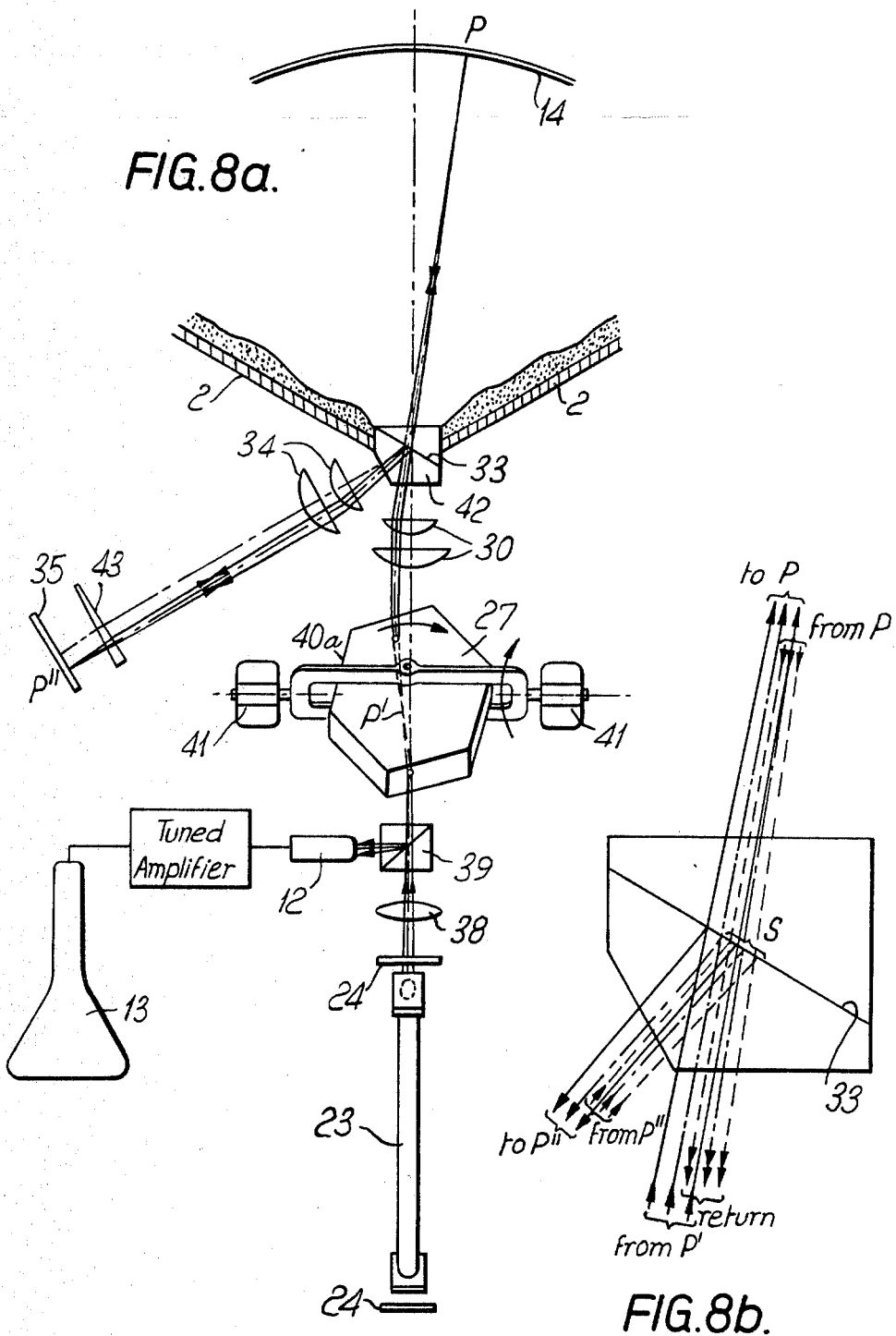

FIGS. 8a and 8b illustrate a device in which the laser light is concentrated in a small spot on the screen, which scans the screen in both dimensions, while the light output is channelled through a single photoelectric sensor.

Figure 1:
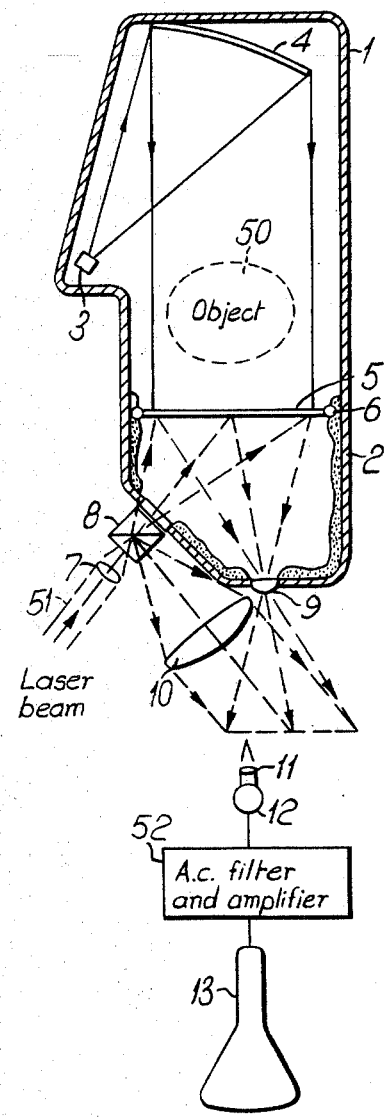
FIG. 1 is a schematic representation of a basic form of the invention in which the vibrating screen is a thin, plane membrane.

FIG. 1 illustrates schematically in plan a device embodying the invention. A tank or tub 1 large enough to take an object 50 contains water or another fluid. Wherever ultrasound waves could strike the walls of the tank, these are lined with absorbing material 2, such as foam rubber, to prevent reflection and standing waves, with the exception of two windows, one for the entrance and the other for the exit of light, which are made as small as possible. A source 3 of ultrasound, such as a resonating piezoelectric crystal is positioned within the tank and a parabolic reflector 4 converts the diverging beam of the source into a parallel beam, which is directed against a screen 5. In the present example the screen 5 is a very thin membrane, of a material, such as nylon or mylar, stretched in a frame 6 and metallized by a diffusing metal layer. In later examples the metallization is a specular reflector. The membrane is so thin and light that it follows the ultrasonic vibrations with almost no resistance and reflection.

The vibrating screen 5 is illuminated by a laser beam 51 through a lens 7 and a beam-splitting prism 8. It is viewed through a lens 9, which produces an image of screen 5 in a plane shown in dotted lines. A part of the laser light is split off by prism 8, and falls on the image plane in the form of an oblique plane wave. The image plane is scanned by at least one photocell 12 point-by-point through a lens 11. The output of the photocell goes into an a.c. amplifier 52 tuned to the ultrasound frequency, and the rectified output of an amplifier is displayed on a cathode ray tube 13 or the like, preferably a cathode ray tube with memory. This figure is used merely to illustrate the principle in a simple way, and to show all those parts such as the tub 1, the sound source 3 and the object 50 which will not be repeated in the later figures, because, as the following quantitative analysis will show, this arrangement is not practically satisfactory.

Figure 2:
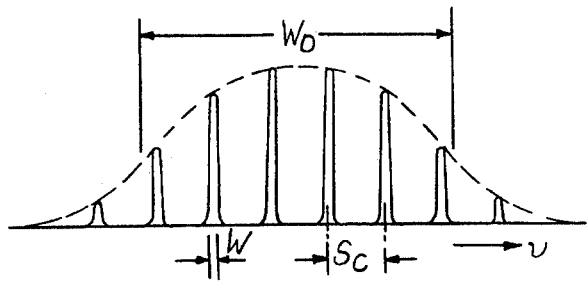
FIG. 2 is an illustration of the spectrum of laser beam.

In order to analyse quantitatively the operation of this device consider first the structure of a beam, such as is emitted by a gas laser. The output consists usually of a number of line groups, each group corresponding to one transition. FIG. 2 shows the structure of one of these groups. In the absence of laser action the line would have a Doppler width $W_D$, of the order of a thousand megacycles. Laser action, that is to say stimulated emission, splits this up into a number of very fine lines, each corresponding to a cavity mode. For the purpose of explanation, assume a helium-neon gas laser with a wavelength of 6,328, of one metre length between mirrors. This has a frequency of $\nu = 4.7 \times 10^{14}$/sec, and there are $1.58 \times 10^6$ wavelengths between the two mirrors. If the laser is properly constructed, for instance with spherical mirrors, there will be only longitudinal cavity modes, spaced from one another by one wavelength, that is to say by a fraction $1/1.58 \times 10^6$ of the frequency, which gives a spacing $S_c$ between the laser lines of about 300 Megacycles. On the other hand, the width $w$ of the laser lines is of the order of a few kilocycles only, or even much less.

Consider first only one laser line with frequency $\nu$, reflected from the vibrating screen with a velocity amplitude $v$. This produces a frequency modulation of the laser line with a swing of $\pm 2(v/c)\nu$. In other words, as shown in FIG. 3, the phase vector of the reflected light oscillates sinusoidally around its middle position, with the frequency $f$ of the ultrasound. The semi-angle $\alpha$ of the swing is $$\alpha = 2(v/c)(\nu/f)$$

As an example assume that the medium is water, with a sound velocity $v = 1.5 \times 10^5$ cm/sec, and the ultrasound power 1 milliwatt/cm². This corresponds to a velocity amplitude of $v = 0.38$ cm/sec, irrespective of the frequency. With $\nu$ as before and $f = 3$ Mc this gives $\Delta = 4.10^{-3}$.

Add now to this oscillating light amplitude a vector $A_o$ of equal length, but in quadrature to its. As shown in FIG. 3, the resultant vector will now be modulated not only in phase but also in amplitude. The component of the light intensity which varies sinusoidally with the frequency $f$ or the ultrasound has a swing of $\pm 2 \alpha A_o^2$, which means that it has an intensity amplitude which is just a fraction $\alpha$ of the d.c. background intensity $2A_o^2$. It can be shown that an added reference amplitude equal to that of the reflected light but in quadrature to it represents the best choice for displaying this frequency component.

One cannot realise this ideal case, because with a somewhat flimsy and movable reflecting screen it is practically impossible to produce a reference wave which in every point is in quadrature to the reflected wavefront. The solution of this difficulty is to make the phase of the reference wave vary across the image, so that it changes its phase by $2\pi$ or a little more in a length corresponding to the ultrasound in water is $1.5 \times 10^5/3.10^6 = 0.05$ cm. or half a millimetre. The ultrasound resolution limit is the wavelength multiplied by 0.6, and divided by the sine of half the angle subtended by the screen as seen from the object. Putting this angle at about 35°–40° gives a resolution just about equal to a wavelength, that is to say half a millimetre. Assuming a screen of 25 cm width we obtain a sound image with $500 \times 500$ lines definition. One must therefore put the light reference beam at such an angle to the image of the screen, that it produces 500 or a little more fringes across it, preferably in the form of straight, parallel, equidistant lines. These are then scanned across, perpendicularly, by at least one photoelectric sensor, with an aperture which must not be more than one half of the fringe spacing, because the a.c. components in adjacent active zones are in counterphase. There will be then 1,000 active zones per line. It is seen that by letting the phase vary uniformly across a line one loses only one half of the amplitude modulation which one would have if the image wave and the reference wave were everywhere in quadrature.

So far the detection of a single laser line has been explained. In reality the laser spectrum contains line groups, such as shown in FIG. 2. If one superposes the frequency modulated spectrum of such a group on the original group, nothing changes, so long as the phases, line for line remain approximately in quadrature. The reason is that the beat with the a.c. frequency $f$ will be produced only by each laser line beating with its own frequency-modified pair, but not by one line beating with another. As the spacing of the laser lines is of the order of hundreds of megacycles, the addition of non-corresponding pairs will result in beat frequencies of at least a few hundred megacycles, and this is safely outside the range of the tuned a.c. amplifier. The previous simple result for the relative intensity modulation remains therefore valid. A new problem arises, however, by the condition that the quadrature relation must be satisfied, at any point of the image, at least approximately, not only for one line but for all those forming a group whose total spacing may amount to about 1,000 Megacycles. This is ensured if the optical path length in the reflected beam and in the reference beam are equal to within about one centimetre. If several strong line groups are emitted by a laser and one wishes to utilise all of them, the equalisation must be even better. The means for achieving this will be shown in later examples.

Consider now the intensity conditions which must be satisfied if the small intensity modulation previously calculated, of the order of a few thousandths, is not to be submerged by background noise. In steady laser operation this is mainly photon noise. Let E be the power, that is to say light energy flux per second in an area which is scanned at one time, that is to say in the area of the sensor aperture. For the reasons previously described, this is about one half of the area of an elementary resolved image element. Let $e = \alpha E$ be the power of the light signal, which is centered at the a.c. frequency $f$, and let $\Delta f$ be the pass band of the tuned amplifier. Then by Schottky's law the mean square noise power in this waveband is $$(\delta E)^2 = 2h\nu E \Delta f$$

where $h$ is Planck's constant, $6.54 \times 10^{-27}$ erg.sec. If we want a signal current: noise current ratio of $(S/N)$ this must be $(S/N)^2$ times smaller than the mean square signal power, which is $\tfrac{1}{2}e^2 = \tfrac{1}{2}\alpha^2 E^2$. This gives the equation $$2h\nu E\Delta f = (N/S)^2 \tfrac{1}{2}\alpha^2 E^2$$

or $$E = 4h\nu\Delta f(S/N)^2/\alpha^2$$

In the above example the photon energy $h\nu$ is $3.10^{-12}$ erg, and $\alpha = 4.10^{-3}$. Assume a bandwidth of $\Delta f = 10$ kc, and a signal : noise ratio $S/N = 10$ in terms of photoelectric currents, or 20 decibels in terms of power. This gives $E = 0.75$ erg/sec $= 0.75 \times 10^{-7}$ watt light power collected by the scanning aperture. As the scanning aperture is equal to or a little less than one half of the elementary resolved area, we obtain for a screen with $500 \times 500 = 2.5 \times 10^5$ elements:

$$0.75 \times 10^{-7} \times 5 \times 10^5 = 0.0375 \text{ watt}$$

Making an allowance for partition noise in the photoelectric element, we require a laser output of the order of 100 milliwatts. Such outputs are within the limits of gas lasers, but the example shows that to record ultrasound waves of the order of 1 milliwatt/cm² or about one watt per square foot, strong lasers must be used, and as much as possible of their light output utilised. It may be noted though that 1 milliwatt/cm² of ultrasound power is very much on the safe side. The first physiological effects are usually observed at 1 watt/cm² in about 100 seconds, hence for irradiations of the order of one second, the power could be safely raised by three to four orders of magnitude. The increased power can be used to improve the signal : noise ratio, or to reduce the laser power, or both. For the following the assumption of a narrow amplifier waveband of 10 kc only is therefore retained. With a bandwidth of 10 kc one scanner can record 20,000 independent picture elements per second, hence the scan of 250,000 elements will take 12.5 seconds. To shorten the exposure time it is therefore preferable to use plurality of scanning elements.

FIGS. 4 and 5 show how the requirement of full utilisation of the laser power may be satisfied by the design of the instrument. FIGS. 4a and 4b are two sections of the observation end of the device, at right angles to one another. The plane diffusing vibrating screen 5 in FIG. 1 has been replaced by a thin but self-supporting spherical shell 14 of a material well matched to water, which carries a specularly reflecting coating. The self-supporting spherical mirror can be also replaced by a very thin metal film or metallized plastic skin which is maintained in spherical shape by excess pressure from the concave side. The centre O of this spherical mirror is in the wall of the water tank. The laser light, after passing a beam splitter prism 8 and a condensing lens 7 is focused in a point which is at one side of the centre O, by a small distance, and is thrown at the screen by a reflecting prism 15. The spherical mirror 14 forms an image of this at the other side of O, and thereby concentrates the whole reflected light in a lens 9 which can be kept very small. The wavefronts F issuing from this lens are spherical. The reference beam is split off at the prism 8 and is thrown against a mirror 16, which reflects it through a condensing lens 117 on to a mirror 18, so arranged that the reference beam appears to issue from a point level with O and level with the entrance point of the image carrying beam. The mirror 16 is placed at such a distance as to equalise the optical paths in the reflected beam and the reference beam. The wavefront F' of the reference beam is also spherical, and it forms an approximately constant angle with the image-carrying wavefront F. Consequently the interference fringes formed by the two beams will form, in planes at right angles to the main axis, a system of approximately straight and equidistant lines in accordance with the requirements above specified.

FIG. 4b is a section at right angles to FIG. 4a, and shows means for producing a coherent ultrasound reference beam. A reference beam is present also in the arrangement as shown in FIG. 1, as by the principles of physical optics a fraction of the illuminating beam always goes through unaffected, but this will be strong enough only if the object is very transparent. A strong reference beam is produced in FIG. 4b by an ultrasound source 18a, driven in synchronism with the illuminating source 3. The wavefront of this ultrasound reference beam is spherical and slightly skew with respect to the mirror 14. The skewing of the reference beam has certain advantages, known in optical holography.

FIGS. 5a to 5c illustrate a plural scanning mechanism, in three views. A belt 19, which can be e.g. of steel runs over rollers 20 in front of a plurality of scanners, which consist of truncated pyramid-shaped transparent light guides 21, each covering a zone in the picture and taken together covering the whole picture area. They are terminated by photoelectric devices 12, each with its own tuned a.c. amplifier. The belt 19 has small holes, preferably rectangular and half as wide in the direction of the scan as at right angles to it; one before each scanning zone, arranged in rows so as to scan successive lines, the whole scan being completed in one revolution of the belt. As an example consider again a picture with 250,000 picture elements and a filter of 10 kc bandwidth. Twelve zones will scan it in a slight fraction over 1 second. Each line has 500 elements and is scanned in 500/200,000 = 0.025 seconds. The image to be scanned may be 5 × 5 cm, hence the belt must move at a speed of 200 cm/sec. and must be a fraction over 2 metres long. The perforated belt is mentioned only as an example of a mechanical scanner, several equivalents are well known in the art.

Each tuned a.c. amplifier is fitted with its own rectifier and its output has a waveband of 0 - 10 kc. In order to display the picture on one cathode ray tube a time division multiplex circuit may be used, so that each output is switched on for about 2 - 4 microseconds to the grid of a cathode ray tube, which is preferably a memory tube, and this play is repeated every 50 microseconds. In this interval the cathode ray spot junps twelve times at right angles to the lines, every time by one zone width, as well known in multiplex oscillography.

Though the device as described in connection with FIGS. 4 and 5 is inferior to those subsequently to be described as regards utilisation of laser power, it has the advantage that the holographic principle previously described can be utilized, that is to say the object explored in depth, without having first to take a photograph of the display tube. This is simplest to understand in a special case, in which the distance of the sound source 18a from the centre of the screen is equal to the screen radius. The sound wavefront shown in dotted lines in FIG. 4b then intersects 14 in a great circle, at right angles to the plane of the drawing. If now spheres centering on 18a are constructed with radii differing by integral multiples of the sound wavelength, these will also intersect 14 in circles parallel to the first-mentioned great circle. Seen from a direction bisecting the angle between 18a and O these will appear as straight lines. These will be briefly referred to as the ultrasound Fresnel zones.

Transform now the origin of the light reference wave front F' into the optical space of the screen 14, and call this O'. This is not shown in the FIG. 4, to avoid confusion. Put this point O'' into such a position that its light Fresnel zones coincide with the previously mentioned sound Fresnel zones of the point-source 18a. But as in the method according to the invention maxima appear twice per fringe, these Fresnel zones must be constructed with spheres spaced by multiples of one-half of the wavelength of light. As in the previously described example the light wavelength in water is about 1/1,000 of the sound wavelength, the distance between O'' and O will be about 2,000 times smaller than that between 18a and O.

If the adjustment is made as described, the optical reference wave is the equivalent of the sound reference wave. It acts therefore in the same way as the optical reference wave used in the reconstruction process in light holography. Combined with the image wave it reproduces the sound field, but on a very much reduced scale. A first spatial image of the sound field at the other side of the screen will be produced very near to O, in a small region. This is magnified by the lens 9, and the magnified image can be explored in depth by the scanning system as shown in FIG. 5. By suitable choice of the transverse magnification it is possible to make the depth of the spatial image equal to original, or strongly exaggerated.

The special case in which the light reference wave appears as an exact optical continuation of the sound reference wave has been chosen here only by way of a simple illustration. It is known from light holography that if the reference beam in the reconstruction is not the same as the original, the result is a certain optical transformation of the object, which somewhat distorts it, but still leaves it recognizable.

FIGS. 6 and 7 illustrate other realisations of the invention, in which the laser power is better utilised, by illuminating only a narrow strip of the vibrating screen at any time, and scanning this across the screen, at right angles to its direction, which in these figures is assumed at right angles to the plane of the drawing.

Figures 6A, 6B, 6C:
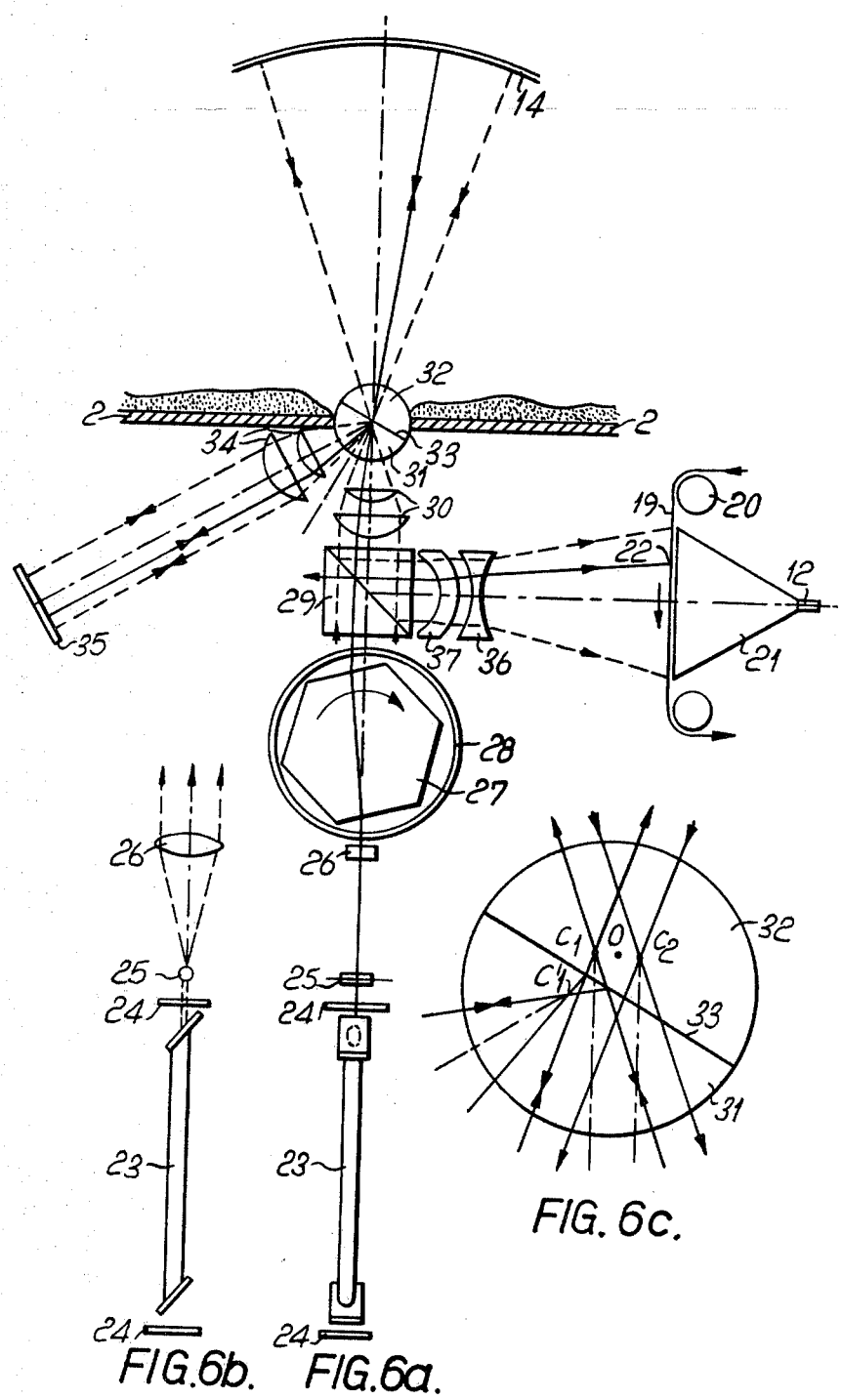
Figures 7A, 7B:
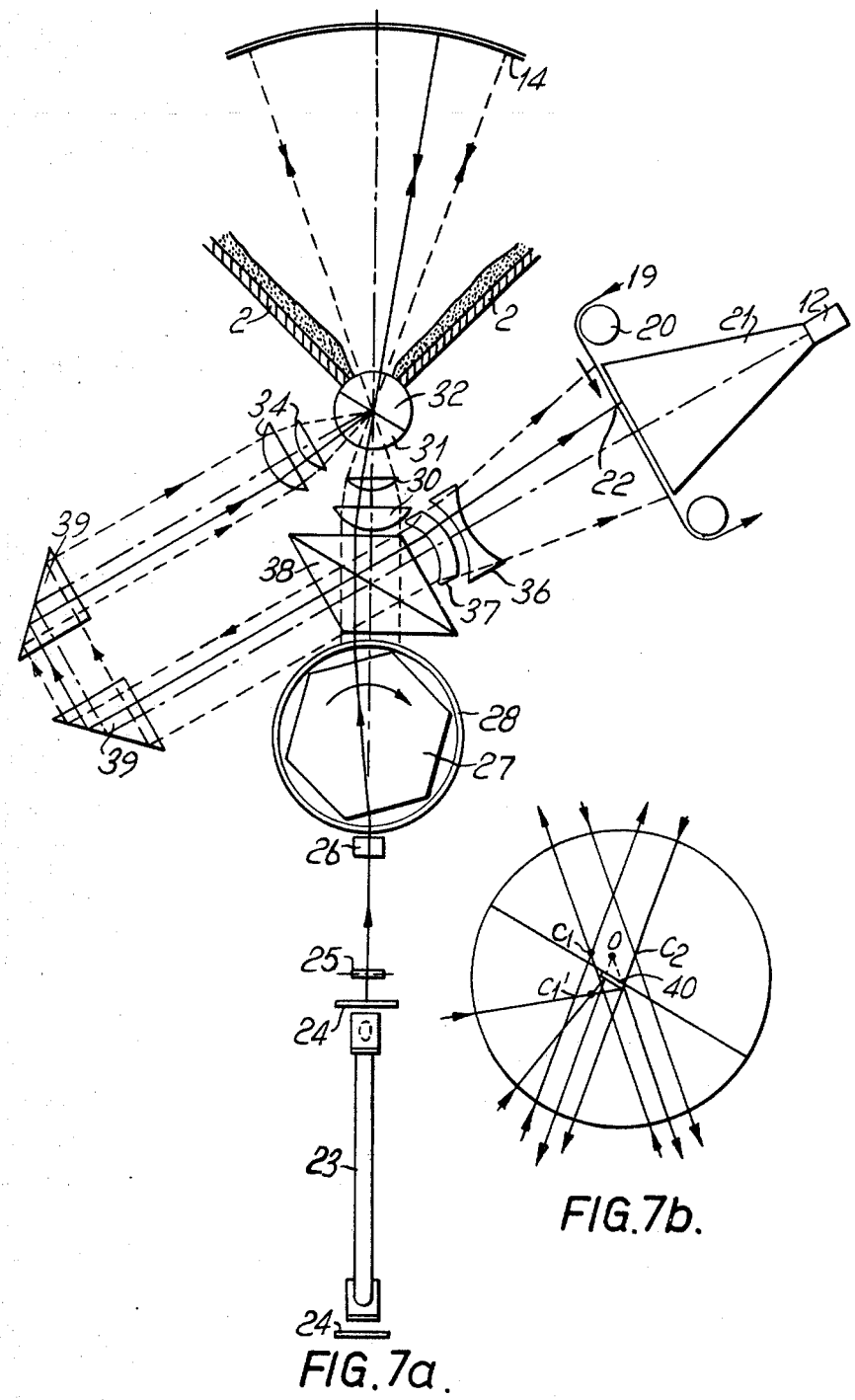

FIG. 6a is a plan view of a device, in which the light emitted by a gas laser 23, with laser mirrors 24 is concentrated in a thin flat beam, with its long side at right angles to the drawing, by means of the two cylindrical lenses 25 and 26, which form an afocal pair. This may be better seen in FIG. 6b, which shows the laser and the cylindrical lenses 25 and 26 in elevation. The first of these lenses, 25, can be made in the form of a thin glass rod.

The parallel beam of elongated cross section next falls on a rotating polygonal prism 27, which is made of glass or some other transparent material. This rotates at such a speed that one face of the polygon crosses the light beam in the time of a line scan. If for instance a picture with 500 lines is scanned by 10 photoelectric devices simultaneously, and a picture scan is completed in one second, the line scan takes 1/50 of a second, and a hexagonal prism 27 has to rotate with 50/6 revolutions per second, or with 500 per minute. In order to keep the fluctuating wind caused by the prism away from the optical device it is preferable to surround the prism with a non-rotating glass tube 28. In the drawing, the width scanned out by the beam is shown in dotted lines, while the narrow beam itself is shown as a continuous line.

The beam next falls on a 50–50 beam splitting prism 29. The transmitted part of the beam is focused by a lens 30 at or very near to the centre of a spherical lens, which consists of two hemispherical halves 31 and 32, with a semi-reflecting layer 33 between them. The transmitted part of the beam falls almost perpendicularly on the spherical ultrasound viewing screen 14, which reflects it back almost in its original direction. The part reflected at 33 serves as the non-modulated reference beam. This passes through a lens system 34, identical with 30, and is collimated. The collimated beam is thrown back on itself by a perpendicular mirror 35. The distance of this mirror is so adjusted that the optical path lengths of the viewing beam and of the reference beam are almost equal to the point at which they are again united.

The conditions at the semi-reflecting surface 33 are better seen in FIG. 6c, which represents an enlargement. The light which has passed through the lens system 30 is focused in the point $C_1$. The transmitted part proceeds from here to the viewing screen 14, and is re-focused by this in the point $C_2$, symmetrically spaced to $C_1$ relative to the centre O of the spherical surface 14. The part reflected at the surface 33 is focused in the mirror image $C_1'$ of $C_1$, and is re-focused in this point by the self-collimating system consisting of 34 and 35. After reflection at 33 it appears to issue from $C_1$. The distance between $C_1$ and $C_2$ must be small. If for instance a picture with 500 independent points per line is required, 500 interference fringes must be formed between the viewing beam and the reference beam. This means that the angle between the two interfering wavefronts must be such as to displace one against the other by 500 wavelengths from one side of the viewing screen to the other. For example if the ultrasound viewing screen 14 has a radius of 500 mm, a width of 300 mm and the wavelength of the laser light in water is 0.75 microns, the distance between $C_1$ and $C_2$ must be $$500 \,(500/300)\, 0.75 \times 10^{-3} = 0.62 \text{ mm}$$

This is the best adjustment for 500 picture elements per line. If it is smaller, a moire effect might appear in the picture. If it is larger, that is to say, if there are more fringes than picture elements, the utilisation of the light will be less effective, as modulations of opposite phases appear across the scanning aperture. The adjustment can be made very accurately before taking a picture, by observing the fringe system in the plane 19 through a magnifying glass.

The viewing beam and the reference beam return together through the lens system 30 and fall collimated on the beam splitting prism 29. The reflected part of the light is used for observation. The picture is suitably magnified by a lens 36, and thrown on the light collecting guides 21 of the photoelectric elements 12, through the scanning apertures 22 in the scanning band 19. The main difference as compared with the previously described devices is now that the illuminated zone moves with the scanning apertures 22. In order to obtain maximum increase in the efficiency, this zone must be as narrow as possible, for instance 1/100 of the picture width. But a correction is required, because the scanning apertures move exactly linearly with time, while the rotating prism 27 produces a slightly more than linear deviation. Without correction the error would be such that for instance in the case of a hexagonal prism with a refractive index of 1.525 there would be a deviation of about ± 1.5% of the picture width between the evenly moving scanning apertures and the unevenly moving illuminated zone. This would mean that the luminous zone could not be made less than one-thirtieth of the picture width, hence the gain as compared with full illumination could not be more than 30. FIG. 6a shows one way of correcting this, by a cylindrical, strongly curved meniscus lens 37. This can be made so that it has zero or almost zero power at the centre, but possesses strong spherical aberration, so that it deflects the marginal rays a little inwards, and thereby corrects the non-linear error of the rotating prism. Many other ways of effecting such a correction are shown in the optical art.

The system as illustrated in FIG. 6 is relatively simple, but it has the disadvantage that at most one-eighth of the laser light is utilized for the final image formation, because of the two semi-reflecting surfaces 29 and 33, each of which is used twice by each half of the beam. It may be noted though that the loss of 50% of the light in the beam splitter 29 can be avoided by means well known in the optical art. There exists beamsplitter prisms with composite layers known as Brewster-angle prisms, which entirely reflect light of one polarisation, while transmitting the other. As laser light is linearly polarized, a quarter-wave birefringent plate between 29 and 30 will turn it into circularly polarized light, and on return it will rotate the polarization plane by a right angle. It is therefore possible to make the prism 29 fully transmitting for the outgoing ray, and fully reflecting for the returning wave.

FIG. 7 shows an optical arrangement which is somewhat more complicated, but which has even better light economy, and it allows in principle the utilization of one-half of the total light.

Most of the elements are the same, and have been numbered in the same way as in FIG. 6. One difference between the two is that the square beam splitting prism 29 is replaced by the lozenge shaped prism 38, with a semi-reflecting face at 60° to the incoming beam instead of 45°. This allows utilisation of one-half of the beam intensity, which previously was thrown away, by means of the reflecting prism 39, which replace the self-collimating mirror 35. By this the reference beam is made independent of the illuminating beam. This is utilized by making the interface between the glass hemispheres 31 and 32 fully transmitting instead of semi-reflecting, with the exception of a small patch 40, which is now made fully reflecting, for instance by silvering. This patch is made only large enough so as not to widen the reflected beam by diffraction beyond the required width of the illuminated zone. In the previous example 0.1 mm would be sufficient, but to avoid making the adjustment too critical, 0.3 – 0.5 mm is preferable. The reference beam now appears to return from the centre O of the sphere, and the distance which is relevant for the interference fringe pattern is now not $C_1 - C_2$ but $O - C_2$. If this is made, as in the above example, about 0.6 mm, there will be no loss in the viewing beam intensity, either at the first passage or at the second. A loss of one-half of the intensity occurs therefore only after the return of the two beams, at the semi-reflecting surface in 38. The efficiency can be therefore made as large as 50%, apart of course from the losses at the lens and prism surfaces, and at the viewing screen. Assuming a system corrected for the non-linear shift error, so that only one one-hundredth of the screen width is illuminated at any time, there is therefore a gain of about 50 in the utilisation of laser light above the systems described in the parent application.

An even more efficient form of the invention is shown in FIGS. 8a and 8b. In this system, the whole scanning is performed by one fixed spot P which scans over the screen 14. The scanning motion is achieved by making the rotating prism 27 swivel slowly in a suspension frame 40a around a horizontal axis, in bearings 41. For a scan of 500 lines to be completed in one second the hexagonal prism 27 has to rotate at 5,000 revolutions/minute and during this time it swivels slowly from a position at which it is inclined about 30° forward to a position in which it is inclined about 30° backwards.

In this system, the selection of the screen element is done entirely by the sharply focused spot P. This is achieved by introducing a lens 38 forming a focus of the originally parallel laser beam at P' which is subsequently imaged by the lens system 30 in the point P at the screen. A prism 42 takes the place of the spherical lens 31 in FIGS. 6 and 7. This contains a semi-reflecting interface 33 which splits off one half of the light and throws it through the collimating system 34 towards a mirror 35 which is at the same optical distance from the interface 33 as the screen 14, so that the beam is focused in a spot P'' on the mirror.

In FIG. 8a it is assumed for simplicity that the focus of the lens system 30 and the center of the interface 33 are in the center of the spherical shell 14, so that the light rays return on exactly the same path as they enter the apparatus. In this case, it is necessary to achieve an equivalent of the shearing of the two wavefronts through one another, as illustrated in FIG. 4a, by other means. This is achieved by introducing into the branch which contains the mirror 35 a slightly wedge-shaped transparent plate 34 which produces, on the double passage, the required phase change proportional to the deflection of the spots P and P'. In order to make the beam return in itself the mirror 35 is not at right angles to the axis of this branch but it is slightly inclined so that the central ray deflected by the prism is incident at right angles to the mirror.

On the return the light is split by the interface in a semi-reflecting prism 39 and falls on a photocell 12. This is connected through a tuned amplifier to a cathode ray display tube 13, or to a facsimile recorder or the like. The rotating prism 27 causes a slight pincushion distortion, which, however, is approximately compensated by the curvature of the screen 14 so that display device 13 can be operated with only a small correction in the scan.

It is not necessary in this system to make the spherical shell 14 to be exactly centred on the focal point of the lens 30. FIG. 8b illustrates this more general case. If the centre of 14 slightly departs from the point in which the axis parallel rays are focused, by 30, the beams from P and from P" will not return on the same path. It is essential though that they shall issue ultimately from the same patch S at 33, so that the rays from P and from P" return to the photocell 12 on exactly the same path. This can be achieved by suitable adjustment of the mirror 35. This condition is essential because in the two wavefronts arriving at the photocell from P and from P" at most about a quarter wavelength difference can be tolerated without losing an apprecialbe part of the sensitivity. The correct adjustment can be checked by means of a magnifying glass before the entry into the photocell 12. The mirror 35 is adjusted until the two light patches coincide. If they coincide at this point, they also coincide in direction, hence also at S, because of the geometry of the system, i.e., because of the equality of the two optical branches.

The efficiency of this device in terms of utilisation of laser power is very high. Consider again the previous example, with 1 mw/cm² sound power density, $\alpha = 4.10^{-3}$ and signal noise of 20 db, i.e., $S/N = 10$. But this time 250,000 elements have to be scanned in one second. As there are two signals per scanning element, we require a waveband of at least $f = 2.5 \times 10^5$ cps. The previously used formula now gives a minimum light power of 18.8 erg/sec or 1.88 microwatts. Considering that only one-eighth of the light power is utilised, the minimum laser energy is 15 microwatts. Making allowances for partition noise, a laser with about 100 microwatts or 0.1 milliwatts is sufficient for a signal : noise ratio of 20 decibels. With a sound power density of 0.1 watt/cm² and the same laser power the signal : noise ratio can be raised to 40 decibels. With 1 milliwatt laser energy, the time for a full sound picture can be reduced to 0.1 sec. provided that a sufficiently fast lightscanning mechanism is available.

I claim:

1. Apparatus for recording ultrasonic vibrations comprising a fluid medium, an ultrasonic generator coupled to the fluid medium for transmitting ultrasonic vibrations therethrough, a screen having a specularly reflective surface immersed in the medium and matched to the wave impedance thereof for responding to the transmitted vibrations, means for directing coherent light onto the reflective surface of the screen, means for superimposing on the resulting frequency modulated light beam reflected from the surface of the screen an angularly displaced coherent reference light beam having at least a fraction of the waves therein in phase quadrature with the waves of the reflected beam to convert the frequency modulated reflected light into a recordable amplitude modulated light beam and recording means, the recording means comprising a photoelectric device responsive to the resultant amplitude modulated light beam and tuned scanning means responsive to the signal produced by the photoelectric device for producing an output signal representative of the pattern of the vibrations across the screen.

2. Apparatus according to claim 1 wherein the coherent light directing means and the angularly displaced coherent reference light beam superimposing means comprise a source of laser light and means for splitting the light emitted by the source into two approximately equal parts, one part being directed onto the reflective surface of the screen and the other part comprising the reference beam, the optical path lengths traversed by each part before superimposition being approximately equal.

3. An ultrasonic camera according to claim 1 in which an object to be viewed is placed in the fluid medium such that the pattern of vibrations across the screen comprises an ultrasonic image of the object and further comprising means for converting the output signal produced by the scanning means into a viewable image of the object.

4. Apparatus according to claim 3 further comprising a second ultrasonic generator coupled to the fluid medium for directing reference ultrasonic vibrations onto the screen without modification by the object in such a manner that the resultant vibrations of the screen due to both the energy transmitted through the object and the unmodified energy set up a sound hologram.

5. Apparatus as claimed in claim 3 in which the screen comprises a thin spherical shell of plastic material having a thickness which is a multiple of one-half the wavelength of the ultrasound in the material and having a radiation reflecting surface at its concave side.

6. Apparatus as claimed in claim 3 in which the phase difference between the reflected and superposed radiation varies regularly and continuously in one direction in dependence on the position on the screen from which the radiation is reflected.

7. Apparatus as claimed in claim 6 in which the distance in the said direction for a full cycle of phase change is not more than the minimum distance of resolution by the ultrasonic image.

8. Apparatus as claimed in claim 7 in which the reflected and superposed radiation are together viewed through a viewing aperture in said photoelectric device having a width in the said direction corresponding to approximately half the minimum distance of resolution of the ultrasonic image and a width at right angles to the said direction corresponding to approximately the limit of resolution.

9. Apparatus as claimed in claim 3 and including means for focussing radiation reflected from the screen to form an image thereof, and wherein the photoelectric device sequentially scans the surface of the image.

10. Apparatus as claimed in claim 3 in which the screen is part-spherical in shape.

11. Apparatus as claimed in claim 10 in which the means for directing the radiation onto the screen comprises means for uniformly illuminating the screen by a spherically fronted wave originating from a point close to the centre of the sphere and in which the superposed radiation is another spherically-fronted wave originating from a point slightly displaced with respect to the origin of the reflected wave.

12. Apparatus as claimed in claim 10 in which the means for directing radiation onto the screen comprises means for focussing the radiation into a narrow strip-like beam incident on the screen and means for scanning the beam in a direction at right-angles to the strip.

13. Apparatus as claimed in claim 10 wherein the coherent light directing means and the angularly displaced coherent reference light beam superimposing means comprise a laser, means for focussing the radiation from the laser into a strip-like beam, a polygonal prism positioned to receive the focussed radiation, scanning means comprising means for rotating the prism about its axis, means for focussing the scanning beam emitted from the prism to a point close to the centre of the spherical screen, a spherical lens having a semi-reflecting internal surface positioned to receive the focussed scanning beam and split the beam into two parts, the transmitted part being directed onto the screen and reflected therefrom back to the spherical lens, and the reflected part being directed to reflecting means for re-reflecting the reflected part back to the spherical lens after traversing a path of length approximately equal to the path length of the transmitted path; wherein the recording means further comprises a series of apertures positioned in line to receive the combined beams returned from the screen and from the reflecting means and means for causing movement of said apertures in sympathy with the movement of the combined beams caused by the scanning motion; wherein the photoelectric device comprises individual photoelectric sensors associated with the apertures; and wherein the converting means utilizes the output of the sensors to produce a viewable image.

14. Apparatus as claimed in claim 12 wherein the coherent light directing means and the angularly displaced coherent reference light beam superimposing means comprise a laser, means for focussing the radiation from the laser into a strip-like beam, a polygonal prism positioned to receive the focussed radiation, scanning means comprising means for rotating the prism about its axis, a semi-reflecting surface arranged to split the scanning beam into a transmitted part and a reflected part, means for focussing the transmitted part of the beam to a focal point close to the centre of the spherical screen whence it diverges to be incident on the screen and be reflected back to a point close to said focal point, an optical path for the reflected part of the beam arranged to cause said reflected part of the beam to be superposed onto the transmitted part of the beam after reflection from the screen and interfere therewith, the length of the said optical path being substantially equal to the length of the path traversed by the transmitted part of the beam; wherein the recording means further comprises a series of apertures positioned in line to receive the interfering parts of the beam and means for causing movement of said apertures in sympathy with the scanning motion of the beam; wherein the photoelectric device comprises individual photoelectric sensors associated with the apertures; and wherein the converting means utilizes the output of the sensors to produce a viewable image.

15. Apparatus as claimed in claim 10 in which the means for directing radiation on to the screen comprises means for focussing the radiation onto a small are of the screen, and means for scanning the focussed beam over the surface of the screen in line and frame motion.

16. Apparatus as claimed in claim 15 wherein the coherent light directing means and the angularly displaced coherent reference light beam superimposing means comprise a laser, means for focussing the radiation from the laser into a beam of small cross section, a polygonal prism, positioned to receive the focussed radiation, scanning means comprising means for rotating the prism about its axis to produce a line scanning motion and means for tilting the prism about an axis perpendicular thereto to produce a frame scanning motion, means for directing the scanning beam emitted from the prism onto a semi-reflecting surface, where it is split into a transmitted part and reflected part and focussing the transmitted part onto the screen, reflecting means for re-reflecting the reflected part of the beam back to said surface and superposing it onto the transmitted part reflected from the screen, the path lengths for both the transmitted part and the reflected part of the beam being approximately equal and one of said paths including means for producing a small variation in effective path length by amounts dependent on the line scanning motion, means for directing the beams returned both from screen and from the reflecting means back through the scanning prism; wherein the photoelectric device comprises a fixed photoelectric sensor positioned to receive the returning beams; and wherein the converting means produces a viewable image from the output of the sensor and the line and frame scanning motions.

17. A method of recording the vibrations of a member having a specularly reflective surface and vibrating at ultrasonic frequencies comprising the steps of: illuminating the surface with a beam of coherent light; converting the resulting frequency modulated light beam reflected from the surface into a recordable amplitude modulated light beam by superimposing on the reflected beam an angularly displaced coherent light beam, at least a fraction of the waves in the angularly displaced coherent light beam being in phase quadrature with the waves of the reflected light beam, sensing the amplitude modulated light beam with at least one sensor to produce a recordable signal and producing from said recordable signal an output signal representative of the vibrations across the member.

18. A method according to claim 17 in which the specularly reflective surface is immersed in a fluid medium and is matched to the wave impedance of the medium.

* * * * *

UNITED STATES PATENT OFFICE
CERTIFICATE OF CORRECTION

Patent No. 3,869,904                    Dated  March 11, 1975

Inventor(s)  Dennis Gabor

It is certified that error appears in the above-identified patent and that said Letters Patent are hereby corrected as shown below:

Col. 1, line 20, "has" should read --had--;

Col. 2, line 1, "his" should read --this--;

Col. 2, line 45, "engle" should read --angle--;

Col. 5, line 31, after "6,328" insert --Angstroms--;

Col. 5, line 44, "frequencny" should read --frequency--;

Col. 5, line 56, "Δ" should read --α--;

Col. 5, line 59, "its" should read --it--;

Col. 5, line 63, "or" should read --of--;

Col. 6, line 10, after "ultrasound" insert --resolution limit. In the above example the wavelength of the ultrasound--;

UNITED STATES PATENT OFFICE
CERTIFICATE OF CORRECTION

Patent No. 3,869,904      Dated March 11, 1975

Inventor(s) Dennis Gabor      Page - 2

It is certified that error appears in the above-identified patent and that said Letters Patent are hereby corrected as shown below:

Col. 8, line 6, "117" should read --17--;

Col. 9, line 19, "O'" should read --O"--;

Col. 10, line 41, "$C_1$'" should read --$C'_1$--;

Col. 12, line 53, "plate 34" should read --plate 43--;

Col. 12, line 55, "P'" should read --P"--; and

Col. 16, line 1, "are" should read --area--.

Signed and Sealed this twenty-second Day of July 1975

[SEAL]

Attest:

RUTH C. MASON
*Attesting Officer*

C. MARSHALL DANN
*Commissioner of Patents and Trademarks*